United States Patent [19]

Kirby

[11] 4,111,342

[45] Sep. 5, 1978

[54] BREATHING APPARATUS

[76] Inventor: Gary R. Kirby, 38300 Mallast, Mt. Clemens, Mich. 48043

[21] Appl. No.: 715,992

[22] Filed: Aug. 19, 1976

[51] Int. Cl.² .................. F16K 37/00; F16L 29/00
[52] U.S. Cl. .................. 137/557; 128/142 R; 137/614.02; 251/149.5
[58] Field of Search .................. 251/149.2, 149.5; 137/614.02, 557; 128/142.2, 142, 142.3

[56] References Cited

U.S. PATENT DOCUMENTS

| | | | |
|---|---|---|---|
| 214,335 | 4/1879 | Westinghouse, Jr. | 251/149.2 |
| 2,453,475 | 11/1948 | Tobias | 128/145.8 |
| 3,208,449 | 9/1965 | Bartlett, Jr. | 128/145.8 |
| 3,238,943 | 3/1966 | Holley | 128/142.2 |
| 3,462,117 | 8/1969 | Lind | 137/608 X |
| 3,575,167 | 4/1971 | Michielsen | 128/142.2 |
| 3,995,626 | 12/1976 | Pearce, Jr. | 128/142.2 |

FOREIGN PATENT DOCUMENTS

| | | | |
|---|---|---|---|
| 1,373,480 | 8/1964 | France | 137/614.02 |
| 1,129,376 | 5/1962 | United Kingdom | 128/142.2 |

*Primary Examiner*—Irwin C. Cohen
*Attorney, Agent, or Firm*—Gifford, Chandler, VanOphem, Sheridan & Sprinkle

[57] ABSTRACT

In a breathing apparatus having a pressurized tank of a breathable gas, pressure reducing means attached to the outlet of said tank, a pressure gauge line attached to said pressure reducing means, and a breathing tube, the improvement comprising a quick connect-disconnect fluid coupling fluidly connected to said pressure gauge line. The fluid coupling is adapted for attachment to a like fluid coupling on a second pressure gauge line so that upon attachment, two users can simultaneously utilize a single tank of pressurized air.

5 Claims, 6 Drawing Figures

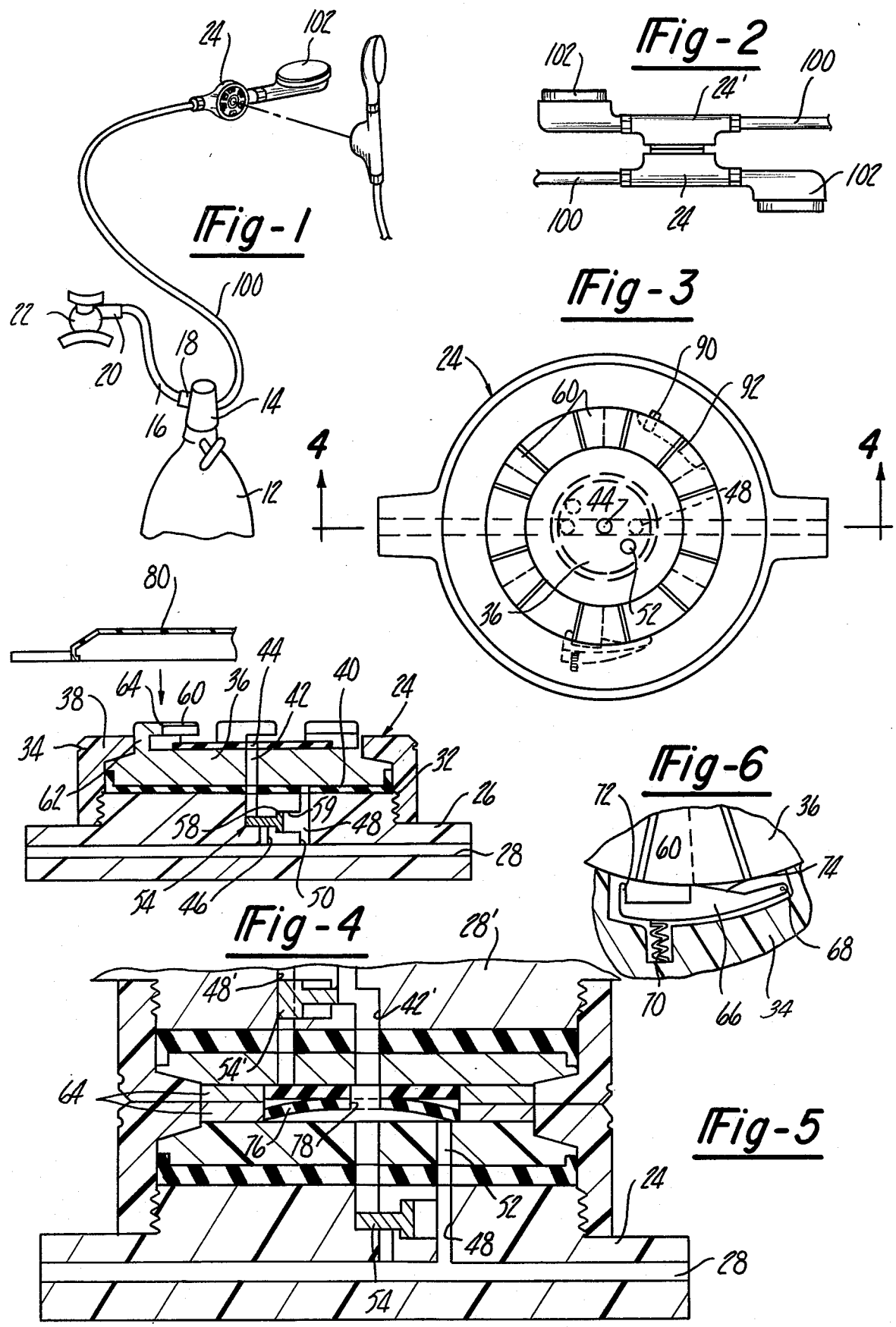

BREATHING APPARATUS

BACKGROUND OF THE INVENTION

I. Field of the Invention

The present invention relates generally to breathing devices and, more particularly, to such a device having a pressure gauge line with a fluid coupling for attachment to a like fluid coupling on a second pressure gauge line.

II. Description of the Prior Art

Pressurized breathing equipment is used in a plurality of different situations, such as scuba diving, rescue operations, and others. Scuba diving equipment for a diver typically comprises at least one pressurized tank of a breathable gas, such as air, and a first pressure reduction means coupled to the outlet of the pressurized tank. A breathing tube is coupled at one end to the pressure reduction means, and at its other end, to a mouthpiece which supplies the air to the diver. Conventionally, a second pressure reduction means is coupled to the tube near the mouthpiece to further reduce the pressure of the air supplied to the diver.

One danger in scuba diving is that the air supply to the diver may be terminated by malfunction or damage to the diving equipment or be exhaustion of the air supply. If termination of the air supply occurs during a relatively shallow dive, the diver merely surfaces to breathe. However, if termination of the air supply occurs during a deeper dive, the diver cannot surface immediately due to the rapid decompression.

As a safety measure, and particularly during deep dives, scuba divers swim in pairs. Thus, when the air supply of one of the divers is terminated unexpectedly, the divers share the air supply of the other diver by passing the other diver's mouthpiece between themselves.

This previously known method of sharing the air from a single tank amoung two divers is disadvantageous for a number of reasons. First, this method is unsanitary since both divers must utilize a common mouthpiece. Secondly, this prior method is troublesome and awkward since each diver must alternately breath and hold his breath. Lastly, a certain air loss occurs each time the mouthpiece is passed from one diver to the other. This air loss is dangerous to the divers if the remaining scuba tank is near exhaustion.

Firemen also carry pressurized breathing equipment on fire fighting missions in order to prevent smoke inhalation. Thus, firemen face the danger of smoke inhalation upon failure of their pressurized breathing equipment.

SUMMARY OF THE PRESENT INVENTION

The present invention overcomes the above-mentioned disadvantages of the previously known pressurized breathing equipment by providing a fluid coupling on the pressure guage line which attaches to a like fluid coupling provided on the pressure gauge line of the breathing equipment of another so that both can use their own breathing tubes while breathing air from the pressurized tank of a single user. Moreover, for ease of description only the device of the present invention will be hereinafter described for use with an underwater breathing tank it being understood, of course, that the device of the present invention is not to be limited to underwater use.

The fluid coupling is of a novel construction which will hereinafter be described in greater detail.

The device of the present invention, thus, provides a simple and novel means which permits two users to breath from a single pressurized tank. Thus, each diver uses his own breathing tube rather than a common mouthpiece as in the prior method. Even more importantly, the divers can breath regularly and simultaneously without the necessity of alternately breathing and holding one's breath.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which:

FIG. 1 is a prespective view showing a scuba diving tank utilizing the device of the present invention;

FIG. 2 is a fragmentary perspective view showing two pressure gauge lines according to the present invention coupled together;

FIG. 3 is a top plan view showing a fluid coupling member of device of the present invention and enlarged for clarity;

FIG. 4 is a sectional view of the coupling member taken substantially along line 4—4 in FIG. 3;

FIG. 5 is a sectional view showing two coupling members attached together and enlarged for clarity; and, FIG. 6 is a fragmentary partial cross-sectional view and showing a portion of the coupling member.

DETAILED DESCRIPTION OF THE PRESENT INVENTION

With reference first to FIG. 1, an underwater breathing apparatus 10 is thereshown and comprises a cylindrical tank 12 pressurized with a breathable gas, such as air. A conventional pressure reducing means or regulator 14 is coupled to the outlet of the tank 12 and a breathing tube 16 in turn is coupled to the regulator 14 in any conventional fashion, such as fluid coupling 18. The other end of the tube 16 is coupled through a second stage pressure reducing means 20 to a mouthpiece 22. Thus, in the standard fashion, a diver can breath the air from the tank 12 through the breathing tube 16 and the mouthpiece 22. The two-stage pressure reducing means 14 and 20 reduce the air pressure in the tank 12 to an acceptable level for breathing.

A pressure guage line 100 is also coupled at one end to the regulator 14 and carries a pressure gauge 102 at its other end. The gauge 102 is fluidly connected by the line 100 to the regulator 14 and provides an indication of the pressure and, hence, the amount of air remaining in the tank. For ease of visibility, the line 100 is typically about 3 feet long and constructed of flexible tubing.

Referring now to FIG. 1, 3, and 4, a fluid connector or a coupling member 24 is attached to the line 100 between the gauge 102 and the pressure reducing means 14 and preferably adjacent the gauge 102. The coupling member 24 includes a housing 26 with a bore 28 formed therethrough. Standard fluid connectors 30 fluidly connect one end of the bore 28 to the gauge 102 and the other end to the line 100 so that fluid communication from the regulator 14 to the guage 102 is uninterrupted.

The housing 26 is generally disc-shaped and includes an externally threaded portion 32. A disc-shaped valve member 36 is coaxially mounted on the housing 26 and an annular cap 34 having an annular inwardly projecting lip 38 threadably engages the threaded portion 32 of the housing 26. Thus, as the cap 34 is screwed onto the housing 26, the annular lip 38 on the cap 34 abuts against the outer periphery of the valve member 36 and retains the valve member 36 to the housing 26. Preferably a flat Teflon seal 40 is positioned between the valve member 36 and the housing 26 to both enhance the rotation and fluidly seal the valve member 36 to the housing 26. A circular flexible seal 76 having a central port 78 is also secured around its outer periphery to the outer axial end of the valve member 36 for a reason to be later described.

A first fluid passage 42 extends coaxially through the seal 76, the valve member 36 and the housing 26 so that one end 44 of the passage 42 forms a port at the valve member 36. The other end 46 of the passage 42 is open to the throughbore 28 in the housing 26. A second fluid passage 48 extends axially through the housing 26 at a point radially spaced from the first passage 42. One end 50 of the second passage 48 is open to the throughbore 28 while the other end of the second passage 48 extends through the Teflon seal 40 and terminates at the inner axial end of the valve member 36.

A third fluid passage 52 (FIGS. 3 and 5) extends axially through the valve member 36 at a point radially spaced from the first passage 42. One end of the third passage 52 opens underneath the seal 76 while the other end of the third passage means 52 terminates at the Teflon seal 40.

Referring now particularly to FIG. 4, a cylindrical shuttle valve 54 having an enlarged diameter portion 58 is slidably contained within a radial bore 59 in the housing 26 which intersects both the first and second fluid passages 42 and 48. As such, the shuttle valve 54 is responsive to the differential pressure across the first and second passages 42 and 48, respectively. Thus, whenever the pressure in the second passage 48 equals or exceeds the pressure in the first passage 42, the shuttle valve 54 moves leftward to the position shown in FIG. 4 and blocks or closes the first passage 42. Conversely, when the pressure in the first passage 42 exceeds the pressure in the second passage 48, the shuttle valve 54 shifts rightward and permits fluid communication through the first passage 42.

As best shown in FIGS. 3, 4, and 6, a plurality of locking dogs 60 are preferably integrally formed with the valve member 36. Each locking dog 60 includes an axially extending portion 62 and a circumferentially extending portion 64 at the outer end of the portion 62. The circumferential portion 64 is axially spaced from and substantially parallel to the exposed end of the valve member 36.

In order to attach two coupling members 24 together, the valve members 36 are axially positioned together in a facing relationship so that each locking dog 60 on each valve member 36 is positioned between two locking dogs 60 on the other valve member. Then by rotation of the valve members 36, the circumferential portion 64 of each locking dog 60 couples underneath the circumferential portion 64 of the locking dog 60 of the other valve member 36 (see FIG. 5), thus locking the valve members 36 axially together.

As best shown in FIGS. 3 and 6, in order to prevent unintended rotation of the valve member 36, a latch 66 is pivotally mounted at 68 to the housing 26. A helical spring 70 urges the latch 66 radially inward toward the valve member 36 so that one locking dog 60 is received in a recess 72 in the latch 66 which prevent rotation of a valve member 36. As two valve members 36 are coupled together in the aforementioned fashion, however, the locking dog 60 of the other valve member 36 engages a cam surface 74 on the latch 66 and moves the latch 66 radially outwardly which permits rotation of a valve member 36.

With reference now to FIGS. 2 and 5, a lower coupling member 24 is thereshown attached to an upper coupling member 24 in the above-described manner. For the purpose of description, it is assumed that the lower line 100 is pressurized while the upper line 100 is not. As will become shortly apparent, such an instance would occur, for example, where the diver with the upper line 100 desires to share the air supply from the lower tank 12 due to exhaustion or malfunction of his own air supply. For ease of description only, a prime (') will be added to each reference numeral of the upper coupling member 24.

As best shown in FIG. 5, rotation of the valve member 36 brings the second passage 48 and the third passage 52 in registration with each other. Conventional stop means, such as a stop pin 90 (FIG. 3) secured to the housing 26 and received within a groove 92 in the valve member 36 limits the rotation of the valve member 36.

With reference now particularly to FIG. 5, the second and third passages 48 and 52, respectively, in both coupling members 24 and 24' are in registration with each other as has been previously described. The upper end of the third passage 52 opens underneath the inflatable seal 76 so that the inflatable seal 76 expands upwardly against the corresponding seal 76' on the upper coupling member 24' thereby providing a fluid tight between the coupling members 24 and 24'.

The high pressure from the tank 12 communicates with the second passage 48 and forces the shuttle valve 54 leftward thus closing the first passage 42. Similarly, the air pressure in the first passage 42' exceeds the pressure in the second passage 48' so that the shuttle valve 54' is forced leftward (as viewed in FIG. 5) which permits fluid communication through the first passage 42' and to the bore 28'. In this manner, with the coupling members 24 and 24' locked together by the locking dogs 60 and 60', as shown in FIG. 5, pressurized air flows from the bore 28 up through the second and third registering passages 48 and 52, underneath the inflatable seal 76 and to the port 78. From the port 78, the pressurized air flows through the first passage 42' and to the housing throughbore 28'.

In this manner, the pressurized air from a single tank 12 may be simultaneously used by two divers by merely attaching the coupling members 24 and 24' together.

In order to detach the members 24 and 24', the coupling members are merely rotated in the opposite direction relative to each other which unlocks the locking dogs 60 and separates the coupling members 24. Simultaneously, the second and third passages 48 and 52 on each of the coupling members 24 are moved out of registration, as shown in FIGS. 3 and 4, thereby preventing the escape of pressurized gas through the coupling member 24. If desired, however, a cap 80 (FIG. 4) cover the valve member 36 when not use and prevents damage to the valve member 36.

It can, thus, be seen that the underwater breathing apparatus of the present invention provides a novel means whereby two divers can share the air supply from a single tank while utilizing their own breathing tube and mouthpiece. Moreover, the novel fluid coupling for connecting the breathing tubes together is not only inexpensive but also dependable and leakproof.

Having thus described my invention many modifications thereto will become apparent to those skilled in the art to which it pertains without deviating from the spirit of the invention as defined by the scope of the appended claims.

I claim:

1. A breathing apparatus of the type having a tank adapted to be pressurized with a breathable gas, pressure reducing means fluidly coupled to the outlet of said tank and a pressure gauge line having a pressure gauge at one end and fluidly coupled to the pressure reducing means at its other end where said gauge provides an indication of the fluid pressure in said tank, the improvement comprising:

a normally closed fluid connector connected to said pressure gauge line and adapted for fluid connection to a like fluid connector on a second pressure gauge line whereby upon connection of two fluid connectors fluid communication between the pressure gauge lines is established wherein said fluid connector comprises a housing, a normally closed disc-shaped valve member rotatably carried by the housing between a first and second rotational position wherein said valve member is closed in the first rotational position;

said fluid connector having a first fluid port in communication with said pressure gauge line and a second fluid port on said valve member, first passage means extending substantially coaxially through said housing and said valve member between said fluid ports;

second passage means extending through said housing at a position radially spaced from said first passage means and open at one end to the first port;

third passage means extending through said valve member at a position radially spaced from said first passage means, said third passage means having one end open to said second fluid port, wherein the other ends of said second and third passage means are in registry when said valve member is in its second position;

a valve responsive to the differential pressure between said first and second passage means whereby said valve closes said first passage means when the pressure in said second passage means equals or exceeds the pressure in said first passage means; and means for detachably connecting said fluid connector with a like fluid connector whereby said valve member opens upon said connection to permit fluid communication between the fluid ports.

2. The invention as defined in claim 1 wherein said means for connecting said fluid connector with a like fluid connector comprises inter-digital locking members secured to and extending axially outward from said valve member whereby said locking members are adapted to secure the valve members on two fluid connectors coaxially together.

3. The invention as defined in claim 2 and including latch means for preventing rotation of said valve member.

4. The invention as defined in claim 3 wherein at least one of said locking members including means for disengaging said latch means.

5. The invention as defined in claim 1 and including an annular inflatable seal secured over said valve member which inflates outwardly in response to fluid flow from the first port to the second port through the second and third passage means.

* * * * *